R. GRISWOLD.
HIGH SERVICE DAM.
APPLICATION FILED OCT. 7, 1908.

929,667.

Patented Aug. 3, 1909.
4 SHEETS—SHEET 1.

WITNESSES

INVENTOR
Robert Griswold
BY
ATTORNEYS

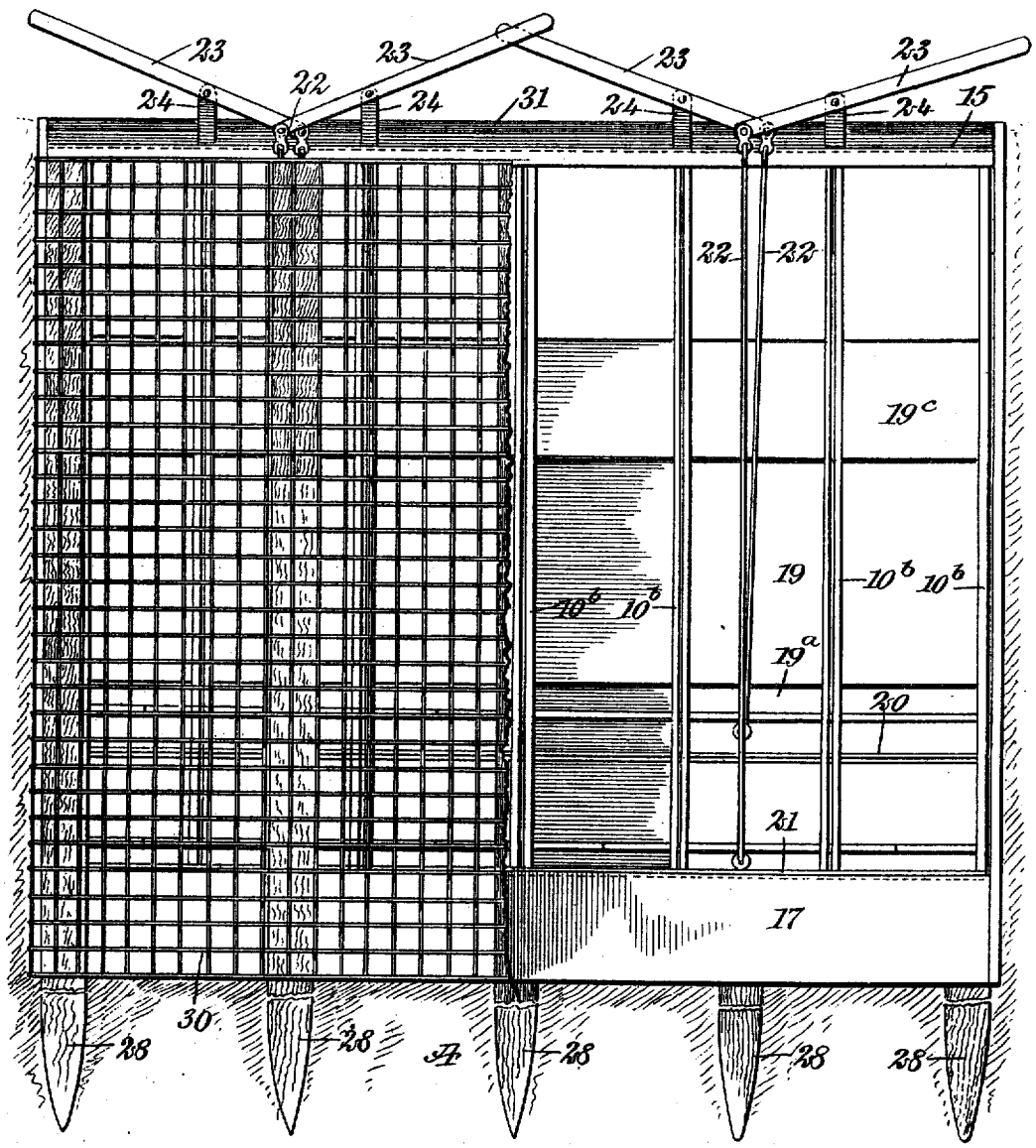

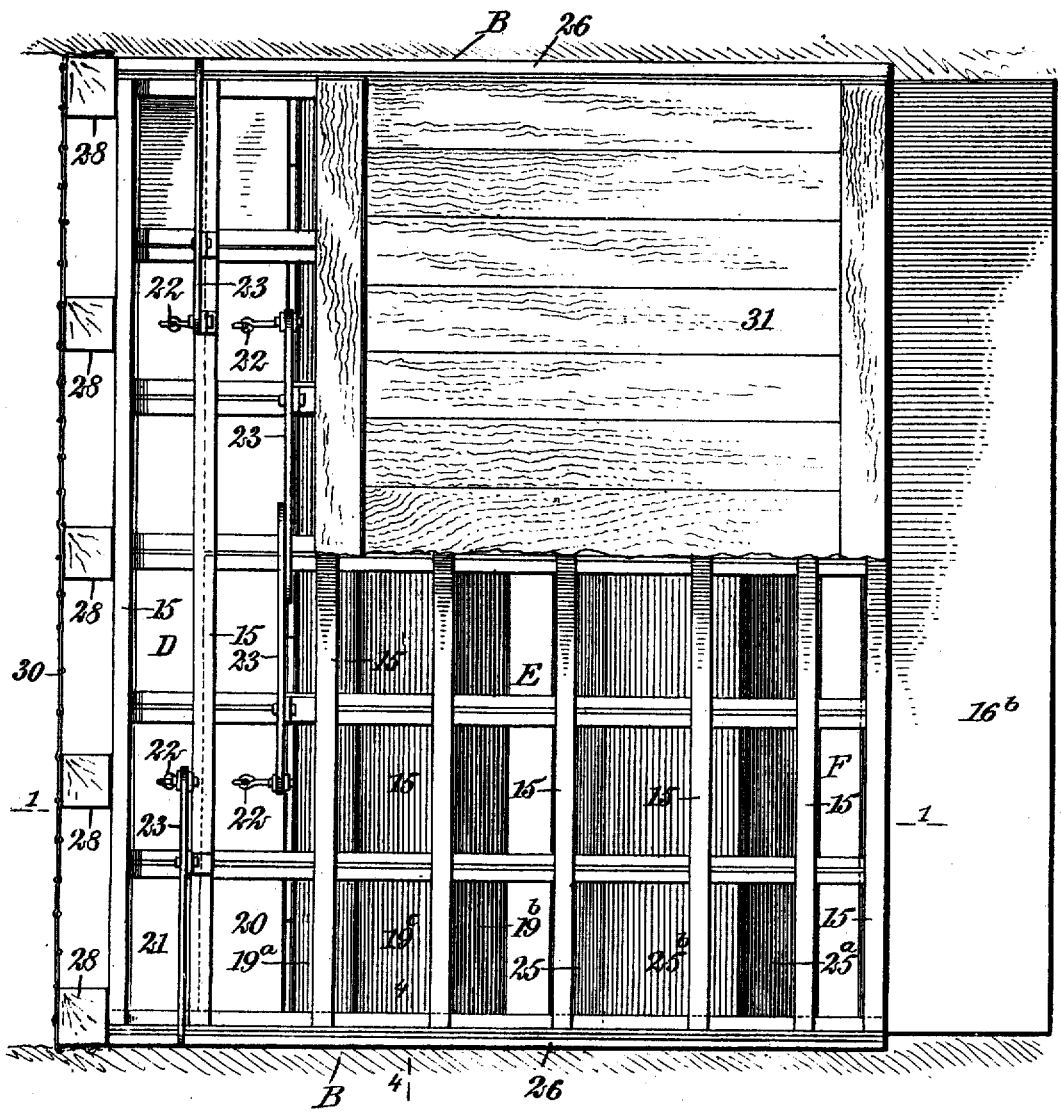

R. GRISWOLD.
HIGH SERVICE DAM.
APPLICATION FILED OCT. 7, 1908.

929,667.

Patented Aug. 3, 1909.
4 SHEETS—SHEET 4.

WITNESSES

INVENTOR
Robert Griswold
BY
ATTORNEYS

UNITED STATES PATENT OFFICE.

ROBERT GRISWOLD, OF DENVER, COLORADO.

HIGH-SERVICE DAM.

No. 929,667.  Specification of Letters Patent.  Patented Aug. 3, 1909.

Application filed October 7, 1908. Serial No. 456,601.

*To all whom it may concern:*

Be it known that I, ROBERT GRISWOLD, a citizen of the United States, and a resident of Denver, in the county of Denver and State of Colorado, have invented a new and Improved High-Service Dam, of which the following is a full, clear, and exact description.

In many localities in the western portion of the United States there are large areas of highland, which are intersected by canyons or gorges, through which the scanty water from these plateaus is constantly drained, leaving them barren or nearly so. The gorges which carry away the water from the highlands are usually rugged, steep declivities, and heretofore but little effort has been made to arrest the flow of water that descends with force and rapidity, and store the water for the purpose of irrigation. The character of the soil thus deprived of surface irrigation is such, in many localities, that if properly saturated with water large crops of cereals and fruit may be grown or good grazing areas may be created.

The purpose of this invention is to provide novel details of construction for a high service dam, that adapt the dam for erection in a gorge or canyon near the highland, so as to arrest a portion of the water drained therethrough, and produce back water for irrigation of the soil over which the arrested water is returned.

The invention consists in the construction and combination of parts, as is hereinafter described and defined in the appended claims.

Reference is to be had to the accompanying drawings forming a part of this specification, in which similar characters of reference indicate corresponding parts in all the views.

Figure 1:
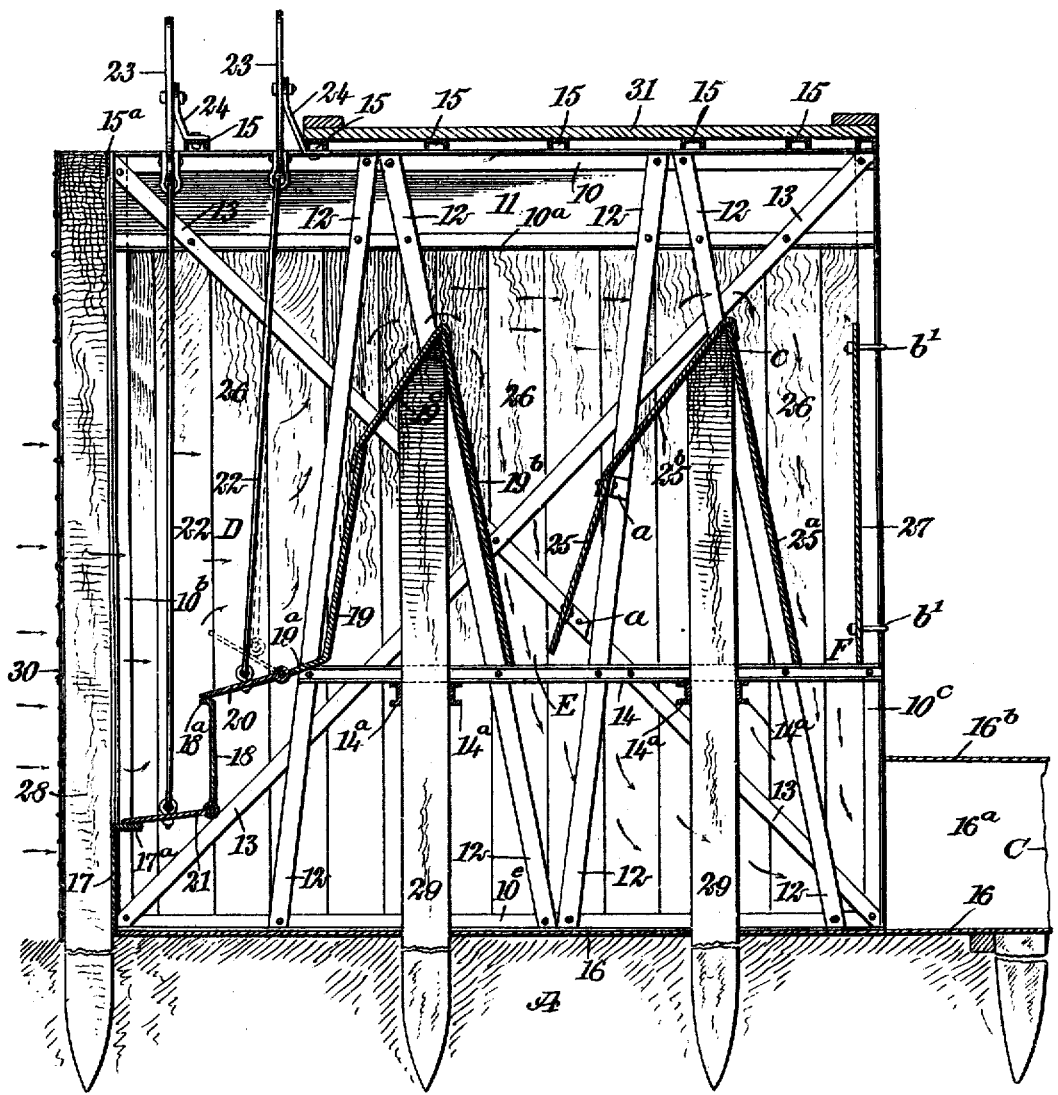
Figure 4:
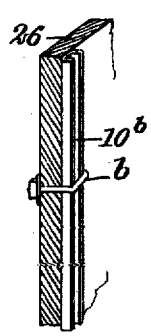
Figure 5:
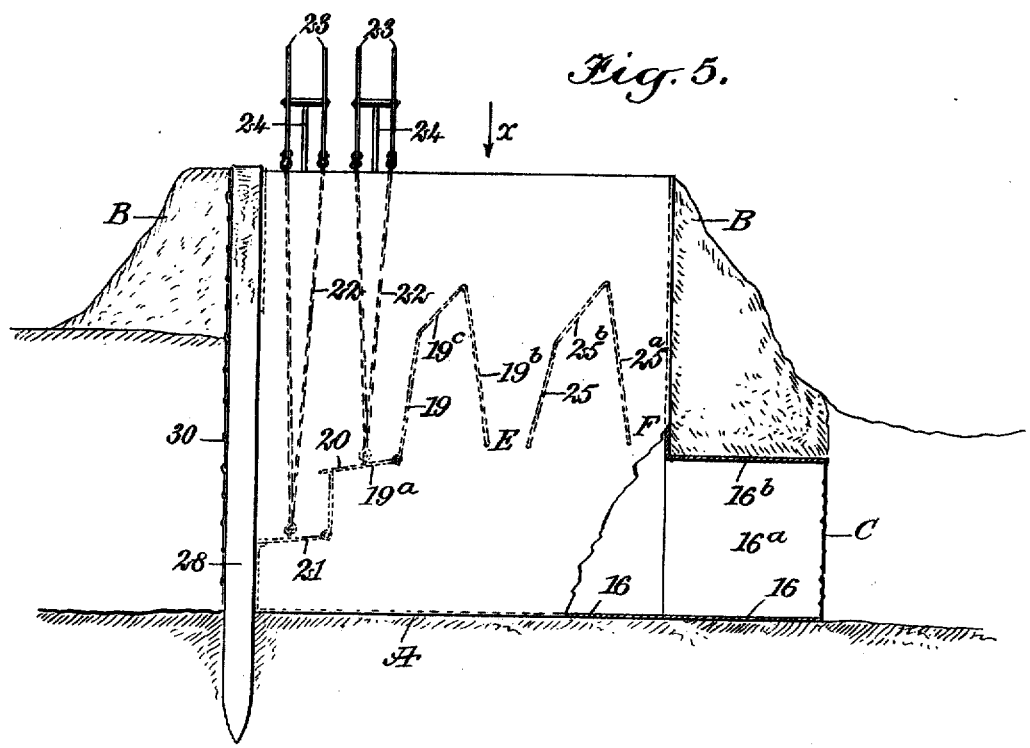
Figure 6:
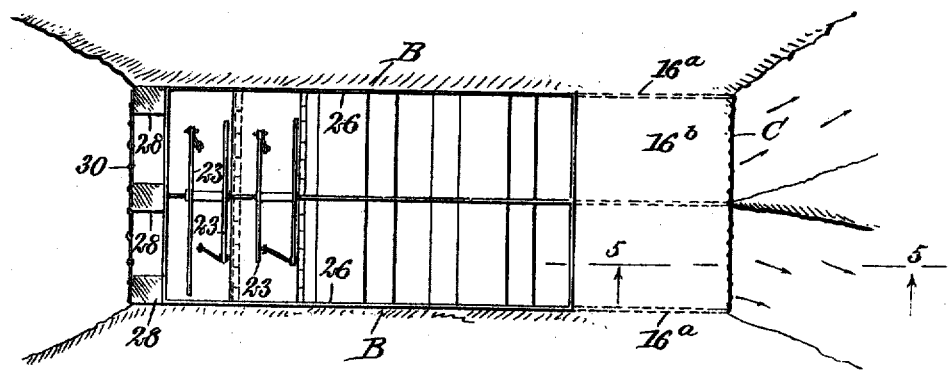

Figure 1 is a longitudinal sectional view of the improved dam, substantially on the line 1—1 in Fig. 3; Fig. 2 is a front elevational view, a portion being removed to clearly expose other details; Fig. 3 is a plan view of the dam; Fig. 4 is an enlarged transverse sectional view of details, substantially on the line 4—4 in Fig. 3; Fig. 5 is a longitudinal sectional view of the dam erected in a gorge, taken substantially on the line 5—5 in Fig. 6, and Fig. 6 is a plan view of the same, seen in direction of the arrow $x$ in Fig. 5.

The structure forming the framework of the dam is preferably rectangular, considered as an entirety, and consists of a plurality of similar sections, each section embodying a rectangular border frame formed of four iron or steel channel bars secured together at their meeting ends. The border frame of each section is strengthened by the employment of a channel bar $10^a$, that is secured at its ends on the front and rear vertical members $10^b$, $10^c$ of the border frame, said channel bar being disposed at a suitable distance from the top member 10 of the frame section and parallel therewith. The channels in the top frame bar 10 and parallel reinforcing frame bar $10^a$ are faced toward each other and receive between them in said channels the side edges of a plate metal beam 11, wherein the latter is secured. Each frame section is further strengthened by two pairs of spaced braces 12, which are formed of channeled bars of iron or steel. The upper ends of the braces 12, considered in pairs, are secured adjacent to each other upon the top frame bar 10, and thence the braces diverge toward their lower ends, which lap upon and are secured to the lower horizontal bar or member $10^e$ of the main frame section, this arrangement of the braces for each main frame section appearing in Fig. 1, and it will be therein seen that the two pairs of braces 12 are spaced apart so as to brace the frame section effectively. Two braces 13, 13 are also provided for each main frame bar section, said braces crossing each other at their centers, where they are secured together, their ends being respectively disposed and secured in the corners of the frame, formed by the junction of the upright front and rear frame bars $10^b$, $10^c$ with the top and lower frame bars 10, $10^e$.

A completing member for each main frame section consists of a horizontally-arranged channel bar 14, that extends from the front nearly upright brace 12 to the rear vertical frame bar $10^c$, whereon said bar is lapped and secured, and is also secured upon the remaining braces 13, upon which it is lapped.

In assembling a suitable number of the main frame sections that have been described, to produce a complete structure having a width proportioned to that of the gorge in which said structure is to be placed and secured, said frame sections are placed in contact laterally and all are bound together by an attachment of a suitable number of channel bars 15, transversely thereon, said top channel bars being spaced apart and securely affixed upon the top horizontal member 10 of each frame section. A flat frame bar 15ª is transversely secured on the front vertical members 10ᵇ of the plurality of frame sections, at the upper ends of said vertical members, and upon the bottom horizontal member 10ᵉ of each frame section a floor-plate 16 is secured, that binds the lower portions of the frame sections together. Extending from the floor-plate 16 up on the front vertical members 10ᵇ of the main frame sections, a transverse wall-plate 17 is thereon secured, said wall, of proper height, having a horizontal portion 17ª formed or secured on the upper edge thereof and projected rearward. At a suitable distance from the front transverse wall 17 a similar transverse wall 18 is secured, having a horizontal flange 18ª formed on the upper edge thereof and extended forwardly. Rearward of the transverse wall 18 a front breast wall 19 is transversely secured, that extends upward and inclines rearward a proper degree, said breast wall being located rearward of and near to the front nearly upright braces 12. A forward extension 19ª is formed or secured on the lower edge of the breast wall 19, through which the front upright braces 12 extend, and upon the front transverse edge of the extension plate 19ª a flat gate valve 20 of plate metal is hinged at its rear edge, said gate-valve, which inclines somewhat forwardly and downwardly, seating near its front edge upon the flange 18ª, as shown in Fig. 1. Upon the lower edge of the vertical wall 18 the rear edge of a flat gate-valve 21 is hinged, that seats near its free front edge upon the horizontal portion 17ª of the front transverse plate-like wall 17. Upon each plate-valve 20, 21 the lower end of a lifting rod 22 is loosely secured; said rods extending up through the front chamber or fore-bay in the main frame, are each at the upper end thereof shackled upon one end of a lever 23, that is pivoted upon a respective bracket stand 24, erected upon the top frame bars 15 of the structure hereinbefore described, and obviously the depression of the free ends of the levers 23 will raise the gate-valves 20 and 21, so as to open the passages they control. At a proper distance rearward from the inclined breast wall 19 a forwardly-inclined back wall 19ᵇ is erected, said back wall, that is formed of plate metal, extending transversely the full width of the dam and, as indicated in Fig. 1, the forwardly-inclined brace 13 on each section of the main frame of the dam passes through the back wall. The back wall 19ᵇ is considerably higher than the breast wall 19, and upon the upper edges of said transverse walls a comb plate or wall 19ᶜ is imposed and secured, thus completing a hollow dam section, which extends the full width of the supporting structure or frame work of the dam. At a suitable point rearward of the hollow dam section that has been described, a breast-wall 25 is secured on the braces 12 and 13, by means of knee brackets a that project from said braces. The breast-wall 25 is spaced from the back wall 19ᵇ of the front dam section and inclines rearward from said back wall. A back wall 25ª, similar to the back wall 19ᵇ, is erected from the channel bars 14 and inclines forward, engaging the rear braces 12 that serve as supports therefor and, as shown in Fig. 1, the height of the back walls 19ᵇ and 25ª is nearly equal. Upon the upper edges of the walls 25, 25ª a crown wall plate 25ᵇ is seated and secured, which completes the second dam section, that is similar to the one first described, and extends completely across the main structural frame of the high service dam.

Two walls 26, 26 are secured on opposite sides of the main frame, these side walls being preferably constructed of heavy planks secured upon the main frame by means of hook bolts b that engage all the horizontal and vertical channel iron bars that are located at the sides of the main frame, the hooked engagement of the bolts with the channel bars and their insertion through the planks being shown for one plank and bolt in Fig. 4. A back wall of planks is in a like manner secured on the frame. A vertical lining wall 27 is disposed across the rear vertical members 10ᶜ of the main frame and is thereto secured by a plurality of hooks bolts b′, as shown in Fig. 1.

The main frame for the dam is built to conform with the width of the gorge in which it is to be placed, and it should be explained that a level bottom wall A is constructed of masonry, having a proper depth to insure a stable foundation therefor, a bed of cement and broken stone forming the upper stratum of said foundation. In the foundation A, across the front of the main frame, a plurality of piles 28, that are preferably formed of squared timber, are erected at spaced distances apart in the same vertical and transverse planes, and through the floor plates 16 two similar rows of spaced piles 29 are driven into the foundation A, at such points as will locate the sloped upper ends c of these piles below and in contact with the back walls 19ª, 25ª and crown walls 19ᵇ, 25ᵇ at their angular junctions, as shown in Fig. 1. As shown in Fig. 1 the piles 29 are laterally supported by transverse braces 14ª, that extend across the main frame below the frame members 14; said braces 14ª, engaging opposite sides of the piles, are thereto secured by suitable means.

It is essential in the erection of the high service dam that the foundation A be so relatively positioned, that the upper surface of the dam will be disposed such a distance above the surface of the plateau of land to be irrigated, that the two dam sections contained in the main frame will be somewhat higher than said surface of the land, as is indicated in Fig. 5.

At the front of the vertical row of piles 28 a network of heavy wire rods 30 is secured, the purpose of which is to prevent floating drift stuff from passing into and fouling the dam.

At each side of the erected structure a strong wall B of masonry is built from the foundation A up to the top of said structure, thus effecting the secure embedment of the main frame of the completed dam in the gorge at the upper end of the latter.

Across the top members of the main frame for the dam a preferably wooden platform 31 is built, that affords a safe bridge and gives access to the levers 23 for the adjustment of the gate-valves 20, 21.

At the rear end of the main frame structure the floor wall 16 is extended a sufficient distance, and at each side of said frame upright walls 16$^a$ are erected, that are connected by a top wall 16$^b$, thus producing a conduit C for conducting water that passes through the dam to a point lower down in the gorge. As indicated in Fig. 6, the conduit C may be divided by a center wall that is extended longitudinally therein, and thus provides two passages for water that is discharged from the dam and that may be extended to different points where this surplus water may be stored in reservoirs for the irrigation of land on a lower level or for other purposes.

In dry seasons the surface water that usually is drained away from the high plateaus, through one or more gorges, is moderate in volume, and if a dam such as has been described is erected at the head of the gorge, the water may be impounded in the front portion or fore-bay D in the dam structure, the gate-valves 20, 21 then being closed. The volume of water that rises in the chamber or fore-bay D of the dam when it reaches the level of the top edge of the crown wall 19$^b$, will be backed so as to flow in a thin sheet over the highland, covering a large area thereof and thus returning the water for irrigating the soil. If a surplus of water accumulates, so that there is an overflow thereof at the crown of the section of the dam that is nearest the gates 20, 21, this waste water escapes through the opening E, between the back wall 19$^a$ and front wall or breast 25 of the second dam section, and thence passes rearward through the conduits C. Should there be a continuation of rainfall or a flood threatened from the melting of snow, the gates 20, 21 may be opened so as to pass the heavy surplus of water rearward and out through the conduits C. It will also be noted that in the event of an abnormal flow of water into the dam structure, which the area of the gate openings and the passage E will not carry away, such an excess of water will pass over the second dam section and out of the passage F that is provided between the back wall 25$^a$ and the lining wall 27, so that the dam as an entirety will remain intact and stationary, due to its embedment in masonry and the reinforcement afforded by the piles that are anchored in the bottom wall of the concrete foundation.

In carrying into effect the generic features of the invention, immaterial changes in constructive details may be adopted within its manifest scope, and I claim all such deviations from the exact forms, proportions and arrangement of parts as may be embraced within the latitude of the claims.

Having thus described my invention, I claim as new and desire to secure by Letters Patent:

1. A high service dam, comprising a framework, a dam in the framework, and means for permitting the escape of water through the dam.

2. A high service dam, comprising a frame structure built in a gorge that drains high land, and a dam in said structure adapted for returning water to high land from which it was drained.

3. A high service dam, comprising a frame structure of metal built in a gorge, a dam in said structure forming a fore-bay, and controlled means for permitting the escape of water from the fore-bay.

4. A high service dam, comprising a main frame built in a gorge that drains high land, a dam built transversely in the frame and having a passage for water below it, the dam forming a fore-bay for storing water and backing it upon the drained land, said fore-bay having an opening in its bottom that intersects the passage, and an adjustable gate-valve that controls said opening.

5. A high service dam, comprising a main frame built in a gorge that drains high land, a dam built transversely in the frame and having a passage for water below it, the dam forming a fore-bay for storing and backing water upon the drained land, said fore-bay having two openings in its bottom that intersect the passage, and two adjustable gate-valves that control said openings.

6. A high service dam, comprising a main frame built in a gorge that drains high land, and two transverse dams built in the frame and spaced from each other, said dams being located above a water passage into which overflow water therefrom passes.

7. A high service dam, comprising a rectangular main frame formed of metal, and a transverse plate metal dam built in the main frame above a waste water passage therein.

8. A high service dam, comprising a rectangular main frame formed of metal bars, and a transverse plate metal dam built in the main frame above a waste-water passage therein, said frame being secured in a gorge on a masonry foundation by lateral masonry walls.

9. A high service dam, comprising a rectangular main frame formed of metal bars, and a transverse plate metal dam built in the main frame above a waste-water passage therein, said frame being seated in a gorge on a masonry foundation and anchored thereon by a plurality of upright piles.

10. A high service dam, comprising a rectangular main frame formed of metal bars, and two transverse plate metal dams built in the main frame, one rearward of the other and spaced at the bottom therefrom, said dams being located above a waste-water passage, the main frame being seated on a level masonry foundation and each dam supported by a plurality of piles erected in said masonry foundation.

11. A high service dam, comprising a rectangular main frame formed of metal bars, a floor of plate metal, a platform thereon, and two plate metal dams built transversely in the main frame and spaced from each other.

12. A high service dam, comprising a rectangular main frame formed of metal bars, a floor of plate metal, a platform on the frame, a foraminated wall at the front side of the frame, and two plate metal dams built transversely in the main frame above a passage therein and spaced from each other.

13. A high service dam, comprising a rectangular main frame formed of metal bars, a floor plate of metal, a platform on the frame, a foraminated wall at the front side of the main frame, and two plate metal dams built in the main frame over a waste-water passage therethrough, said frame being anchored on a masonry foundation in a gorge by upright piles that are embedded in the foundation and afford support for the dams and the foraminated front wall.

14. A high service dam, comprising a rectangular main frame built of steel channel bars, two spaced plate metal dams built transversely in said frame over a waste-water passage therethrough, and a waste-water conduit extended rearward from the main frame, said frame being built in a gorge near its head for backing drainage water on high land for its irrigation.

15. A device of the class described, comprising a framework, a dam arranged transversely of the framework, said dam having a plurality of gates, and means above the framework for opening and lowering the gates.

16. In a high service dam, a main frame formed of a plurality of rectangular frame sections, similar in construction and secured together laterally.

17. In a high service dam, a main frame formed of a plurality of similar rectangular frame sections, each section constructed of channel bars, braces of channel bars, a floor of plate metal, a foraminated front wall, two spaced plate metal dam sections built in the frame, a pair of gate-valves controlling openings in a fore-bay at the front of the dam sections, and a platform on the main frame.

18. A high service dam comprising a framework, and a plate metal dam arranged transversely of the framework.

In testimony whereof I have signed my name to this specification in the presence of two subscribing witnesses.

ROBERT GRISWOLD.

Witnesses:
WILLIAM S. MILLS,
KELSEY L. MILLS.